United States Patent
Vandemark

(12) 
(10) Patent No.: US 7,263,935 B1
(45) Date of Patent: Sep. 4, 2007

(54) SOD SPRIGGING APPARATUS AND METHOD

(75) Inventor: Keaton D. Vandemark, Spring Hope, NC (US)

(73) Assignee: Carolina Sod and Turf Equipment, Inc., Hendersonville, NC (US)

(*) Notice: Subject to any disclaimer, the term of this patent is extended or adjusted under 35 U.S.C. 154(b) by 0 days.

(21) Appl. No.: 10/850,643

(22) Filed: May 21, 2004

(51) Int. Cl.
*A01B 45/04* (2006.01)
*A01C 11/00* (2006.01)
*A01G 23/02* (2006.01)
*B26D 11/00* (2006.01)

(52) U.S. Cl. .......... 111/101; 111/104; 172/20; 83/863

(58) Field of Classification Search .......... 111/104, 111/901, 100, 105, 109, 114, 101, 199, 200; 172/20; 83/865, 863, 331, 325, 509
See application file for complete search history.

(56) References Cited

U.S. PATENT DOCUMENTS

| | | | |
|---|---|---|---|
| 3,116,795 A * | 1/1964 | Overstreet Jr. .......... 171/116 |
| 3,410,350 A | 11/1968 | Ware | |
| 3,515,079 A | 6/1970 | Ware, Jr. | |
| 3,866,552 A | 2/1975 | Leidig | |
| 3,939,785 A | 2/1976 | Duffy | |
| 4,043,231 A * | 8/1977 | Friedberg .......... 83/863 |
| 4,156,395 A | 5/1979 | Edwards et al. | |
| 4,278,133 A * | 7/1981 | de Marcellus .......... 172/14 |
| 5,083,517 A | 1/1992 | Stevens et al. | |
| 5,351,634 A | 10/1994 | Patton | |
| 5,417,293 A | 5/1995 | Leader | |
| 6,223,662 B1 | 5/2001 | Lastinger et al. | |
| 6,263,616 B1 * | 7/2001 | Hummer .......... 47/65.9 |
| 6,722,297 B1 * | 4/2004 | Nelson, Jr. .......... 111/104 |
| 6,827,151 B1 * | 12/2004 | Winslow .......... 172/32 |

* cited by examiner

*Primary Examiner*—Christopher J. Novosad
(74) *Attorney, Agent, or Firm*—Carter Schnedler & Monteith, P.A.

(57) ABSTRACT

An apparatus for removing grass sprigs from sod and incorporating the grass sprigs into the ground, including a chassis, a sod conveying system mounted on the chassis and configured such that sod may be placed thereon and transported thereby, and a rotary tilling mechanism mounted on the chassis and oriented such that, during operation of the apparatus, the rotary tilling mechanism engages both the sod transported by the sod conveying system and the ground.

15 Claims, 5 Drawing Sheets

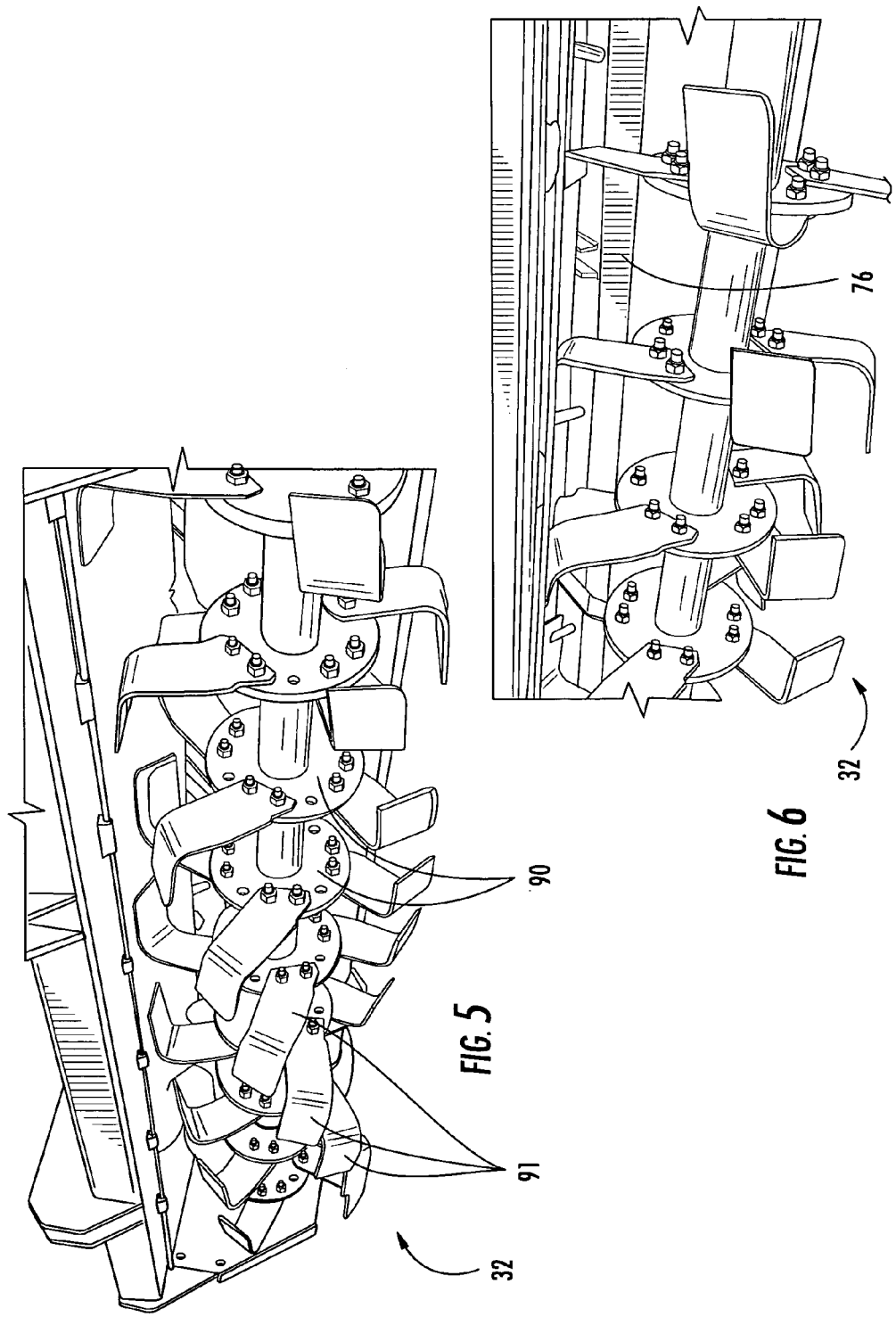

SOD SPRIGGING APPARATUS AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Not Applicable

BRIEF SUMMARY OF THE INVENTION

An apparatus for removing grass sprigs from sod and incorporating the grass sprigs into the ground, including a chassis, a sod conveying system mounted on the chassis and configured such that sod may be placed thereon and transported thereby, and a rotary tilling mechanism mounted on the chassis and oriented such that, during operation of the apparatus, the rotary tilling mechanism engages both the sod transported by the sod conveying system and the ground.

BRIEF DESCRIPTION OF THE SEVERAL VIEWS OF THE DRAWINGS

FIG. 5 is a fragmentary perspective view of the embodiment of the invention shown in FIG. 1, primarily illustrating a portion of the tilling tines of the embodiment; and FIG. 6 is a fragmentary perspective view of the embodiment of the invention shown in FIG. 1, primarily illustrating the relative positions of the tilling tines and the sod guides of the embodiment; and FIG. 7 is a perspective view of the embodiment of the invention illustrated in FIG. 1, shown from a rear side thereof with the guard grille over the soil compacting roller removed to provide a clear view of the soil compacting roller.

DETAILED DESCRIPTION OF THE INVENTION

Figure 1:
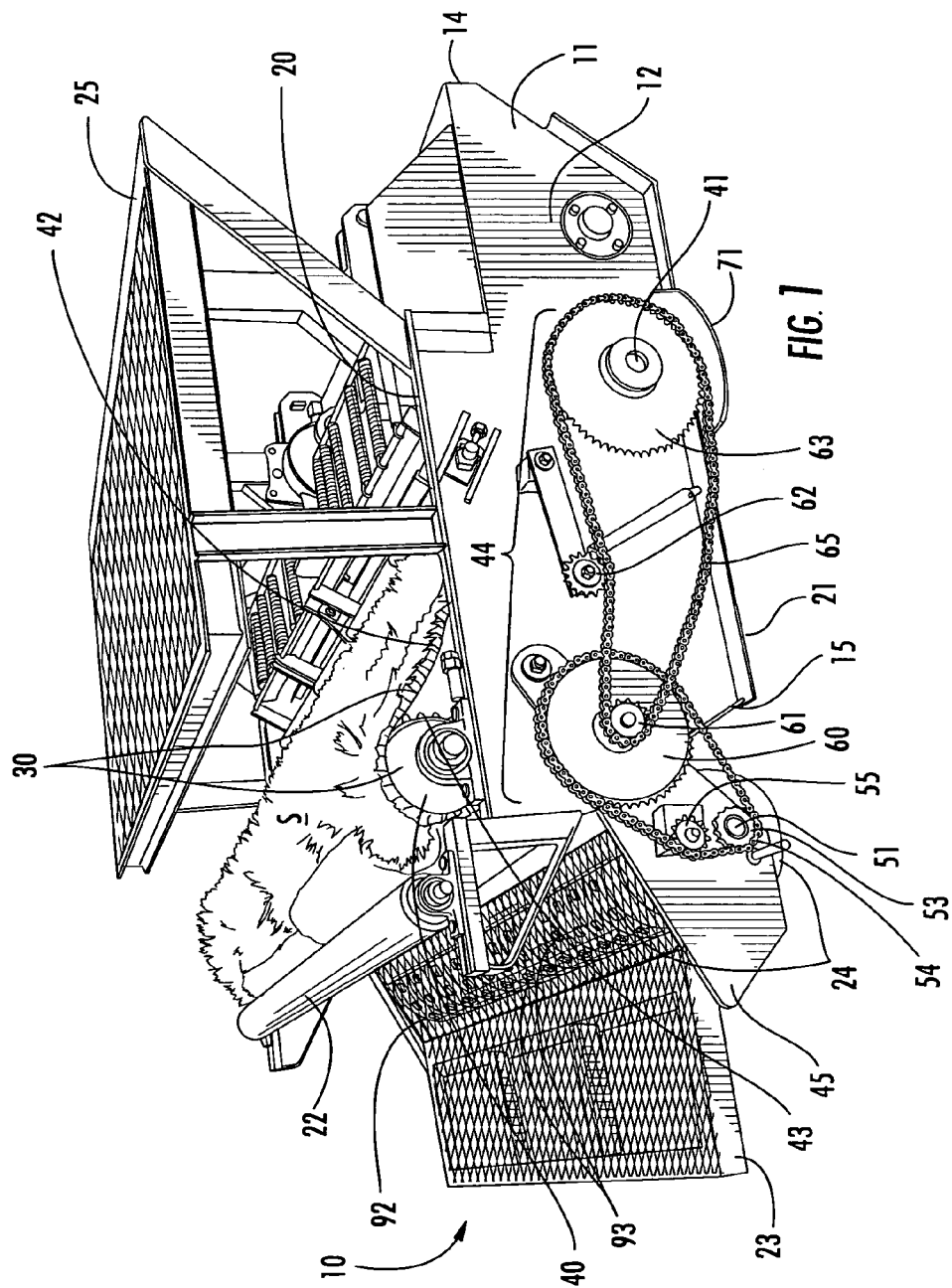
FIG. 1 is a perspective view of an embodiment of the invention shown from the conveyor transmission side thereof.
Figure 2:
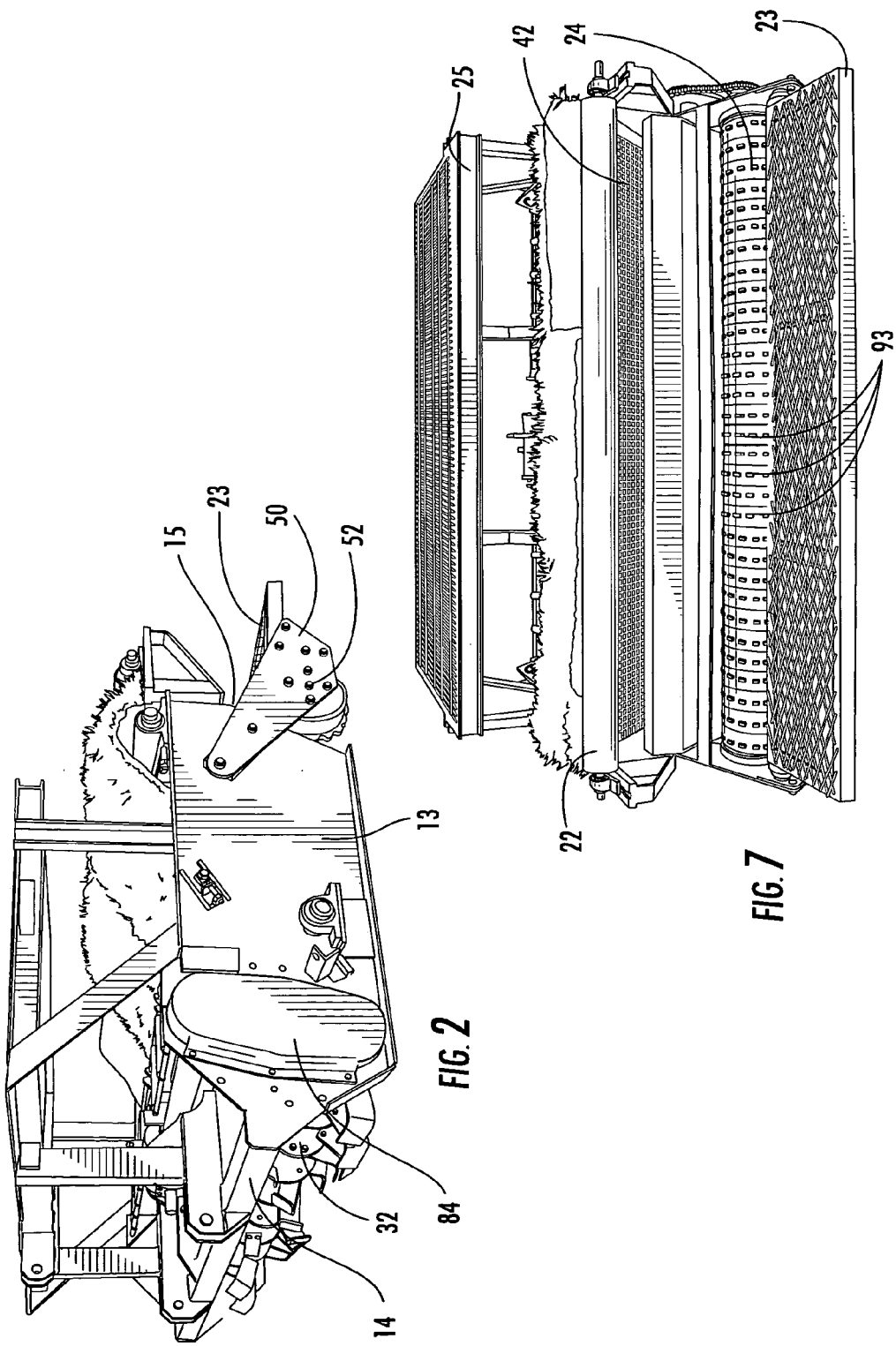
FIG. 2 is a perspective view of the embodiment of the invention illustrated in FIG. 1, shown from the tiller transmission side thereof.
Figure 3:
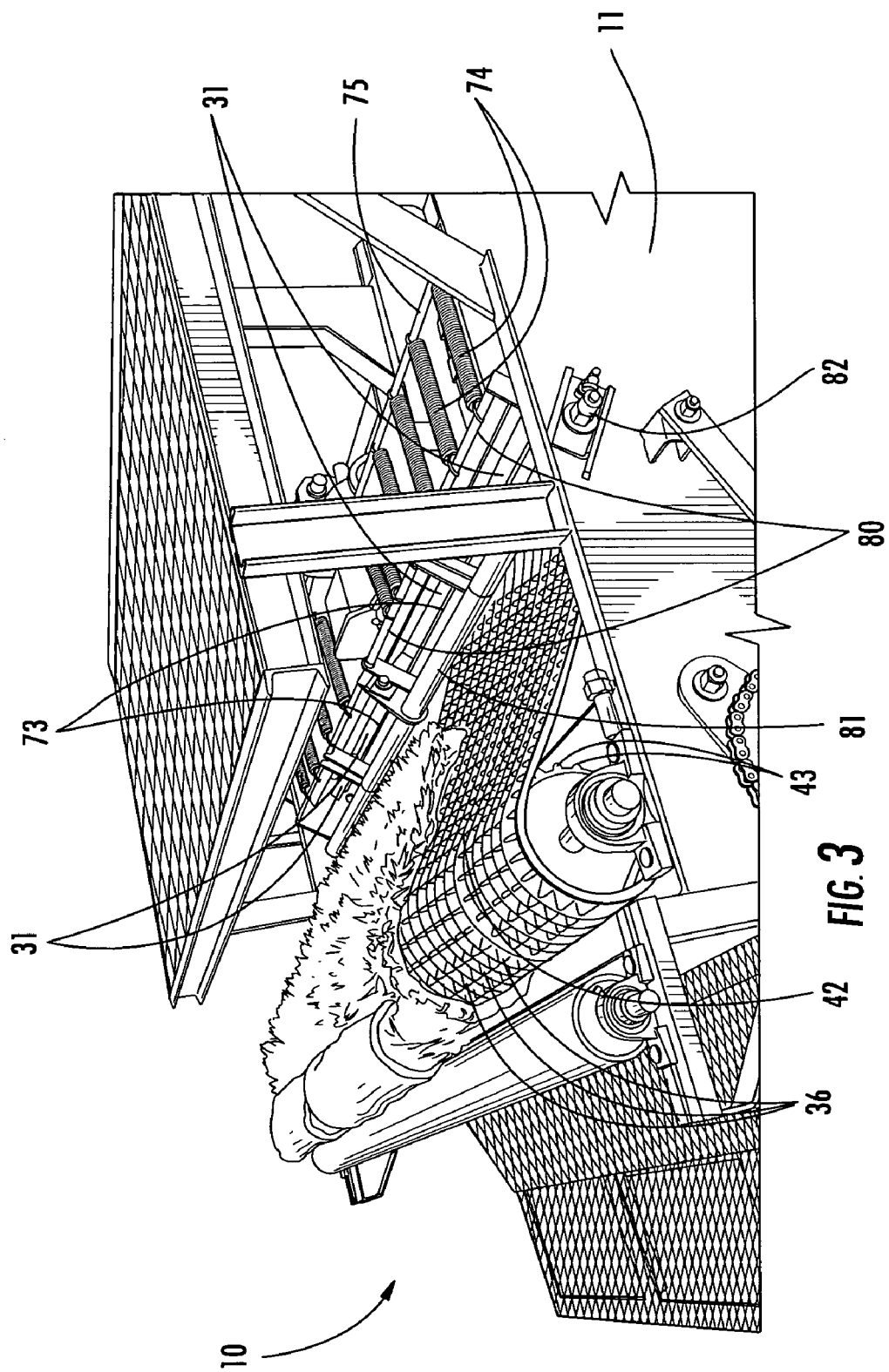
FIG. 3 is a fragmentary perspective view of the embodiment of the invention illustrated in FIG. 1, primarily illustrating the sod conveying system, the sod guides, and the sod platform thereof.

An embodiment of a sod sprigging apparatus or sprigger according to the present invention is illustrated broadly in FIG. 1 at reference numeral 10. The sprigger 10 includes a frame or chassis 11 having a conveyor transmission side 12, a tiller transmission side 13 (FIG. 2) opposing the conveyor transmission side 12, a front side 14, a rear side 15, a top side 20, and a bottom side 21. A sod roller 22, a user platform 23, and a soil compacting roller 24 (shown in FIG. 7 with guard grille 92 removed for clarity) are mounted near the rear side 15 of the chassis 11, while a sod platform 25 is mounted on the top side 20 of the chassis 11. A sod conveying system 30 extends from the rear side 15 toward the front side 14 of the chassis 11 and under a plurality of sod guides 31 (FIG. 3). A rotary tilling mechanism 32 (FIGS. 2, 4) is mounted under the front side 14 of the chassis 11.

Figure 4:
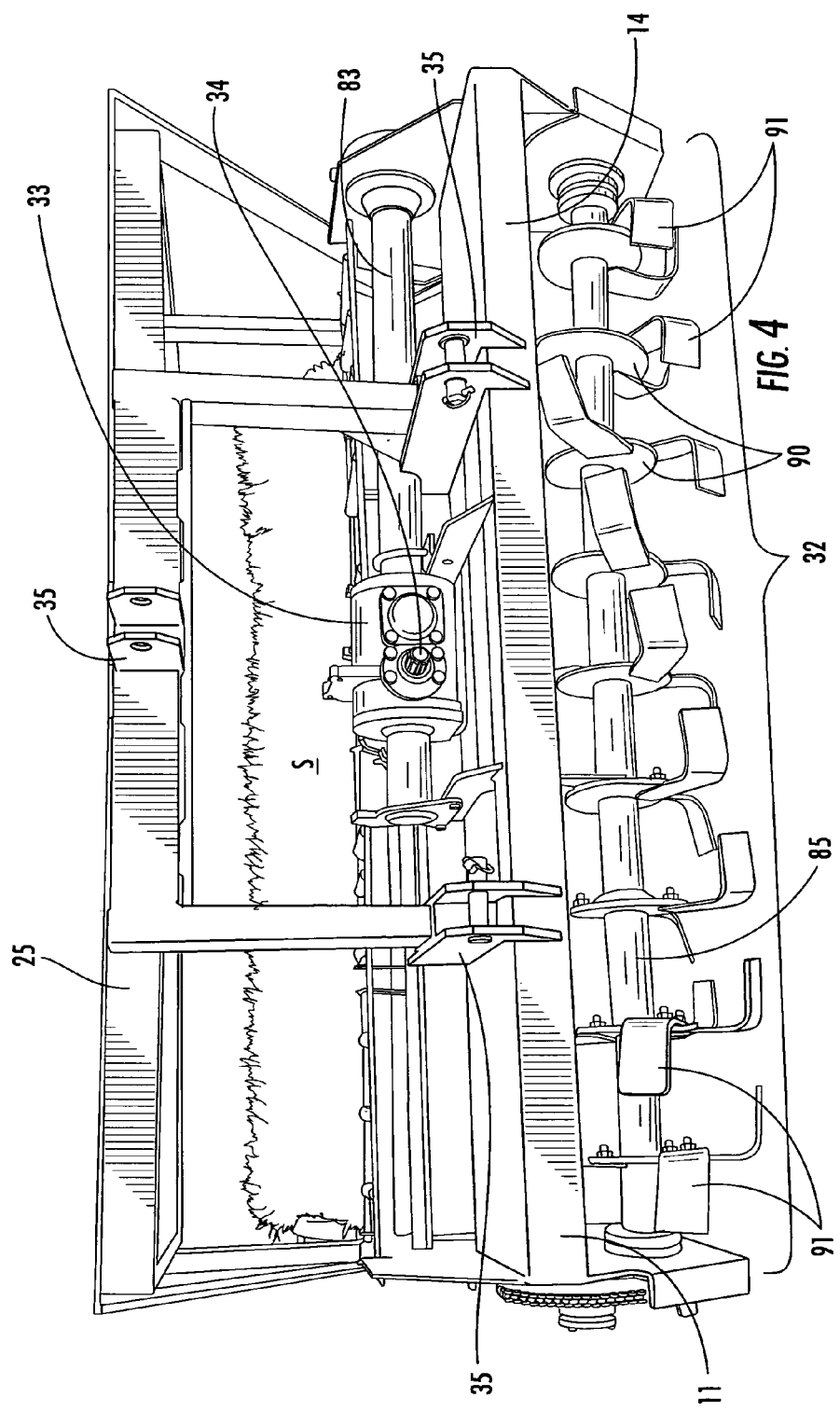
FIG. 4 is a perspective view of the embodiment of the invention illustrated in FIG. 1, shown from the front side thereof.

The sprigger 10 is intended to be towed behind and powered by a tractor (not shown). Therefore, as shown in FIG. 4, also mounted toward the front side 14 of the chassis 11 of the sprigger 10 is a gearbox 33 from which a power takeoff shaft 34 extends. The gearbox 33 is a right-angle gearbox having a 1:1 ratio. In addition, a set of three hitch points 35 are provided, two mounted on the chassis 11 and one mounted on the sod platform 25. The power takeoff shaft 34 is configured to be received by a power takeoff receiver (not shown) commonly found on a rear portion (not shown) of an industrial/agricultural tractor (not shown), while the three hitch points 35 on the sprigger 10 are configured to mate with a three-point hitch (not shown) also commonly found on a rear portion of such a tractor.

Returning to FIG. 1, when the sprigger 10 is in use, sod "S" is placed to rest on the sod roller 22 and on the sod conveying system 30. The sod conveying system 30 includes a first conveyor roller 40, a second conveyor roller (only a shaft 41 carrying the second conveyor roller is shown), and a conveyor belt 42 (also shown in FIG. 3) comprising a course metal mesh having articulating mesh joints 36 (FIG. 3) that enable the conveyor belt 30 to engage and wrap around the first conveyor roller 40 and the second conveyor roller. Outer surfaces of the first conveyor roller 40 and the second conveyor roller are provided with teeth 43 (only shown on the first conveyor roller 40; also shown in FIG. 3) that interlace with the mesh of the conveyor belt 42 to enable the first conveyor roller 40 and the second conveyor roller to actuate the conveyor belt 30. The conveyor belt 30 is maintained substantially taut by the first conveyor roller 40 and the second conveyor roller during operation of the sprigger 10.

The sod conveying system 30 is driven by the soil compacting roller 24 through the conveyor transmission system 44. As discussed more thoroughly below, during operation of the sprigger 10, the soil compacting roller 24 rolls along the ground to pack the soil after the sprigger 10 has torn grass sprigs from sod and incorporated the grass sprigs into the ground for cultivation. The soil compacting roller 24 is carried on the chassis 11 by first and second arms 45 (FIG. 1), 50 (FIG. 2), as is the user platform 23. The first and second arms 45, 50 are mounted on the chassis 11 and receive first and second shafts 51 (FIG. 1), 52 (FIG. 2), respectively, which are mounted on the soil compacting roller 24. As the soil compacting roller 24 rolls along the ground, the first shaft 51 (FIG. 1) mounted on the soil compacting roller 24 rotates a drive sprocket 53 coaxially mounted on the shaft 51. The drive sprocket 53 carries a first chain 54 that engages a first smaller diameter sprocket 55 and a first larger diameter sprocket 60 mounted on the first arm 45. A second smaller diameter sprocket 61 is mounted coaxially with the first larger diameter sprocket 60 and carries a second chain 65, which extends across a tension sprocket 62 and around a second larger diameter sprocket 63. The second larger diameter sprocket 63 is mounted on a shaft 41, on which the second conveyor roller (not shown) is also mounted. A chain guard 71 helps prevent the ground from damaging the second chain 65, and vice versa.

The conveyor transmission system 44 enables the soil compacting roller 24 to drive the second conveyor roller, which in turn actuates the conveyor belt 42. The sprockets 53, 55, 60, 61, 62, 63 and the chains 54, 65 of the conveyor transmission system 44 are configured such that for every twenty feet traveled by the sprigger 10 along the ground, the second conveyor roller moves the conveyor belt 42 one foot. The actuation of the conveyor belt 42 then rotates the first conveyor roller 40, drawing the sod "S" onto the conveyor belt 42 toward the tilling mechanism 32 (FIG. 4) of the sprigger 10. Therefore, only a 1-foot length of sod is needed to incorporate grass sprigs into a 20-foot length of land.

Assisting in the direction of the sod "S" into the sprigger 10 are a plurality of sod guides 31, which are most prominently shown in FIG. 3. Each of the sod guides 31 includes a pressure plate 73 for exerting pressure on the sod "S" to help ensure adequate traction of the sod "S" on the conveyor belt 42 during operation of the sprigger 10. The pressure plates 73 also provide an edge 76 (FIG. 6) against which the sod "S" is forced to help remove grass sprigs from the sod "S" during operation of the sprigger 10. Pressure is maintained on the sod "S" by a plurality of at least partially compressed compression springs 74 that extend between a support rod 75 mounted on the chassis 11 toward the front side 14 thereof and sod guide handles 80 mounted on the sod guides 31. The sod guides 31 are each welded or otherwise attached to a shaft sleeve 81 that houses a stationary shaft 82 that extends the width of the chassis 11. The shaft sleeves 81 pivot about the shaft 82 to enable adjustment of the pressure imparted to the sod "S" and to adjust for sod of varying thicknesses.

Now looking at FIG. 4 and the tilling mechanism 32 of the present embodiment, a shaft housing 83 extends from the gearbox 33. The shaft housing 83 carries a pre-transmission shaft (not shown) that is rotated by the gearbox 33 while the power takeoff shaft 34 extending from the gearbox 33 is rotated by the power takeoff receiver (not shown) on the tractor (not shown). The pre-transmission shaft extends into a transmission housing 84 (FIG. 2) mounted on the tiller transmission side 13 of the chassis 11. The transmission housing 84 houses two sprockets (not shown) connected by a chain (not shown), and is packed with lubricant to ensure smooth operation of the tiller transmission. The chain and the sprockets in the transmission housing 84 cooperate to reduce the standard 540 RPM speed of the power takeoff system of the tractor to a speed of approximately 200 RPM for the tilling mechanism 32.

Returning to FIG. 4, the chain and the sprockets in the transmission housing 84 transmit the rotation of the pre-transmission shaft to a tiller shaft 85, on which is mounted a plurality of tilling wheels 90. A plurality of tilling tines 91 is mounted on each of the tilling wheels 90. Turning now to FIG. 5, the spiral arrangement of the tilling tines 91 across the plurality of tilling wheels 90 is shown. During operation of the sprigger 10, viewing the sprigger 10 from the tiller transmission side 13 of the chassis 11, the tiller shaft 85 rotates clockwise.

Turning now to FIG. 1 and FIG. 7, among other illustrated structures are the sod platform 25 for carrying sod "S", whether in rolls, slabs, or another form, and the user platform 23 on which one or more users (not shown) may stand during operation of the sprigger 10. The users load sod "S" from the sod platform 25 onto the sod roller 22 and the first conveyor roller 40 as the sod conveyor system 30 transports the sod "S" to the sod guides 31 (FIG. 3) and the tilling mechanism 32 (FIGS. 4, 5, 6) for sprig removal and incorporation of the sprigs into the ground at a predetermined depth. The disclosed embodiment of the invention incorporates the sprigs into the ground at a predetermined depth of approximately 1 to 1½ inches; however, the predetermined depth of sprig incorporation may be varied as needed. In addition, the soil compacting roller 24, shown in FIG. 7 with guard grille 92 (FIG. 1) removed, and teeth 93 on the soil compacting roller 24 pack the soil after the grass sprigs are removed from the sod "S" and incorporated into the ground by the tilling tines 91 of the tilling mechanism 32. The weight of the sod on the sod platform 25 and the weight of the users on the user platform 23 also aid in packing the soil after the grass sprigs are incorporated into the ground.

A sod sprigging apparatus and method is described above. Various details of the invention may be changed without departing from its scope. Furthermore, the foregoing description of embodiments of the invention and the best mode for practicing the invention are provided for the purpose of illustration only and not for the purpose of limitation—the invention being defined by the claims.

What is claimed is:

1. An apparatus for removing grass sprigs from sod and incorporating the grass sprigs into the ground, comprising:
   a chassis;
   a sod conveying system mounted on the chassis and configured such that a sheet of sod may be placed thereon and transported thereby; and
   a rotary tilling mechanism mounted on the chassis and oriented such that, during operation of the apparatus, the rotary tilling mechanism engages both the sheet of sod transported by the sod conveying system and the ground to remove grass sprigs from the sheet of sod and plant the grass sprigs removed from the sheet of sod in the ground.

2. An apparatus according to claim 1, wherein the sod conveying system comprises first and second conveyor rollers and a conveyor belt that engages the first and second conveyor rollers.

3. An apparatus according to claim 2, wherein the conveyor belt comprises metal mesh and is maintained substantially taut by the first and second conveyor rollers during operation of the apparatus.

4. An apparatus according to claim 1, wherein the rotary tilling mechanism comprises a tiller shaft carrying a plurality of tilling wheels, each tilling wheel carrying a plurality of tilling tines.

5. An apparatus according to claim 1, wherein the apparatus further comprises a soil compacting roller mounted on the chassis.

6. An apparatus according to claim 5, wherein during operation of the apparatus, the soil compacting roller drives the sod conveyor system through a conveyor transmission system.

7. An apparatus according to claim 6, wherein the conveyor transmission system comprises a plurality of sprockets and a plurality of chains, each chain in the plurality of chains being carried by one or more of the plurality of sprockets.

8. An apparatus for removing grass sprigs from sod and incorporating the grass sprigs into the ground, comprising:
- a chassis;
- a sod conveying system mounted on the chassis and configured such that sod may be placed thereon and transported thereby;
- a rotary tilling mechanism mounted on the chassis and oriented such that, during operation of the apparatus, the rotary tilling mechanism engages both the sod transported by the sod conveying system and the ground;
- a soil compacting roller mounted on the chassis; and
- a conveyor transmission system;
- wherein during operation of the apparatus the soil compacting roller drives the sod conveying system through the conveyor transmission system.

9. An apparatus according to claim 8, wherein the sod conveying system comprises first and second conveyor rollers and a conveyor belt that engages the first and second conveyor rollers.

10. An apparatus according to claim 9, wherein the conveyor belt comprises metal mesh and is maintained substantially taut by the first and second conveyor rollers during operation of the apparatus.

11. An apparatus according to claim 8, wherein the rotary tilling mechanism comprises a tiller shaft carrying a plurality of tilling wheels, each tilling wheel carrying a plurality of tilling tines.

12. An apparatus according to claim 8, wherein the conveyor transmission system comprises a plurality of sprockets and a plurality of chains, each chain in the plurality of chains being carried by one or more of the plurality of sprockets.

13. A method for removing grass sprigs from sod and incorporating the grass sprigs into the ground, comprising:
- providing an apparatus for removing grass sprigs from sod and incorporating the grass sprigs into the ground, the apparatus comprising a chassis, a sod conveying system mounted on the chassis and configured such that sod may be placed thereon and transported thereby, and a rotary tilling mechanism mounted on the chassis and oriented such that, during operation of the apparatus, the rotary tilling mechanism engages both the sod transported by the sod conveying system and the ground;
- placing the sod on the sod conveying system of the apparatus;
- transporting the sod on the sod conveying system to the rotary tilling mechanism of the apparatus;
- removing grass sprigs from the sod with the rotary tilling mechanism of the apparatus;
- planting the grass sprigs removed from the sod in the ground with the rotary tilling mechanism of the apparatus.

14. A method according to claim 13, wherein the apparatus provided in the providing step further comprises a soil compacting roller mounted on the chassis of the apparatus, and the method further comprises packing the soil of the ground with the soil compacting roller of the apparatus.

15. A method according to claim 14, wherein the transporting step comprises driving the sod conveyor system with the soil compacting roller through a conveyor transmission system.

\* \* \* \* \*